United States Patent
Shin et al.

(10) Patent No.: US 8,406,097 B2
(45) Date of Patent: Mar. 26, 2013

(54) REPRODUCTION DEVICE OF RECORDING MEDIUM AND METHOD FOR OPERATING THE SAME

(75) Inventors: Jong In Shin, Seoul (KR); Seong Pyo Hong, Seoul (KR); Woo Hyun Paik, Seoul (KR); Wae Yeul Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 200 days.

(21) Appl. No.: 12/997,783

(22) PCT Filed: Jun. 2, 2009

(86) PCT No.: PCT/KR2009/002917
§ 371 (c)(1),
(2), (4) Date: Dec. 13, 2010

(87) PCT Pub. No.: WO2010/002113
PCT Pub. Date: Jan. 7, 2010

(65) Prior Publication Data
US 2011/0093873 A1   Apr. 21, 2011

(30) Foreign Application Priority Data

Jul. 2, 2008   (KR) .................. 10-2008-0063816

(51) Int. Cl.
*G11B 7/00* (2006.01)
*G11B 21/08* (2006.01)
(52) U.S. Cl. .............. 369/44.14; 369/30.17; 369/19; 720/601
(58) Field of Classification Search ............ 369/44.28, 369/44.14, 44.27, 44.34, 44.35, 53.26, 116, 369/13.02, 53.28, 44.11, 13.22, 30.17; 720/601, 603, 600, 615
See application file for complete search history.

(56) References Cited

U.S. PATENT DOCUMENTS

| | | | |
|---|---|---|---|
| 5,881,318 A | 3/1999 | Liebenow | |
| 6,741,529 B1 * | 5/2004 | Getreuer | 369/30.17 |
| 2009/0164801 A1 * | 6/2009 | Kawahara | 713/189 |

FOREIGN PATENT DOCUMENTS

| | | |
|---|---|---|
| JP | 10-143982 A | 5/1998 |
| KR | 1999-0010550 A | 2/1999 |
| KR | 2001-0028378 A | 4/2001 |
| KR | 10-2004-0105349 A | 12/2004 |

* cited by examiner

*Primary Examiner* — Ali Neyzari
(74) *Attorney, Agent, or Firm* — Birch, Stewart, Kolasch & Birch, LLP

(57) ABSTRACT

A reproduction device of a recording medium and a method for operating the same are disclosed. The reproduction device of a recording medium comprises a recording medium loading unit loading the recording medium, and inputting and/or outputting data of the recording medium; a main board provided with a central processing unit implementing reproduction of the recording medium in accordance with an input signal or a previously set program; and a key operation unit directly connected with a loader of the recording medium loading unit. Accordingly, the sub application processing open and/or close of the recording medium loading unit is actuated after a power supply of the reproduction device is turned, whereby the time required to detach or insert the recording medium from or to the reproduction device can be reduced.

10 Claims, 1 Drawing Sheet

ND METHOD FOR OPERATING
REPRODUCTION DEVICE OF RECORDING MEDIUM AND METHOD FOR OPERATING THE SAME

TECHNICAL FIELD

The present invention relates to a reproduction device of a recording medium and a method for operating the same, and more particularly to, a reproduction device of a recording medium and a method for operating the same, which can reduce the time required to detach or insert the recording medium from or to the reproduction device after a power supply is turned on.

BACKGROUND ART

With the development of digital media technology, various contents such as music, movies, and moving pictures have been come onto the market, and various recording media for recording the contents have been come onto the market. Also, with the trend of lightweight and small-scaled digital devices such as notebook computers, camcorders, and digital cameras, a demand for a small-scaled information recording medium of high capacity increases.

An optical disc that can record data of high capacity is widely used as a recording medium. Among optical discs, a new recording medium of high density, for example, blu-ray disc (BD), which can record and store video data of high picture quality and audio data of high sound quality for a long time, has been recently developed. The BD which is the recording medium technology for next generation is a next generation optical recording solution that can record data. The BD is remarkably superior to the existing DVD. Recently, a technical option of the worldwide standard of the BD is being established together with other digital device.

A reproduction device that reproduces the aforementioned optical recording medium necessarily has an operating system (OS) as recording media become more and more complicated and various. Since the optical recording medium reproduction device has an operating system (OS), if a power supply is turned on, the operating system (OS) is first actuated and then a specific application is loaded. At this time, the reproduction device of the optical recording medium may be actuated faster or later than the operating system in accordance with a type of the operating system. After the operating system is actuated, the application specific for the system is actuated and at same time a function to be implemented by the corresponding device is operated.

In this case, a user feels the time required to implement a specific function after the power supply is turned, very bored. In this respect, HD-DVD/BD player which is being recently developed introduces information as to how short the time required to implement a specific function is, as its key feature.

Furthermore, in order to insert an optical disc to be reproduced to the reproduction device or eject the optical disc from the reproduction device, the user should wait for a long time after the power supply is turned on. Namely, there is provided a software method using an application program implemented on the operating system (OS) as a method for ejecting an optical recording medium inserted to a loading unit for the optical recording medium. An application program for reproducing an optical medium such as a media player is provided with a menu selecting ejection of a disc tray, so that the disc tray is ejected if the user selects the corresponding menu.

In this case, a tray eject command selected by the user is processed through the application program and then transferred to a basic input/output system (BIOS). The BIOS implements a corresponding routine in accordance with a request of the application program, so that a disc tray of a disc drive is ejected to the outside.

However, if the optical disc stores texts or simple data files therein, since software for reproducing them does not exist separately, it is impossible to eject the disc tray in software. In order to eject the disc tray in software, inconvenience occurs in that the user should necessarily implement the corresponding program.

DISCLOSURE OF INVENTION

Technical Problem

Accordingly, the present invention is directed to a reproduction device of a recording medium and a method for operating the same, which substantially obviate one or more problems due to limitations and disadvantages of the related art.

An object of the present invention is to provide a reproduction device of a recording medium and a method for operating the same, which can reduce the time required to detach or insert the recording medium from or to the reproduction device after a power supply of the reproduction device is turned on.

Technical Solution

To achieve these objects and other advantages and in accordance with the purpose of the invention, as embodied and broadly described herein, a reproduction device of a recording medium comprises a recording medium loading unit loading the recording medium, and inputting and/or outputting data of the recording medium; a main board provided with a central processing unit implementing reproduction of the recording medium in accordance with an input signal or a previously set program; and a key operation unit directly connected with a loader of the recording medium loading unit.

In another aspect of the present invention, a method for operating a reproduction device of a recording medium comprises booting an operation program of the reproduction device of the recording medium; actuating a sub application processing open and/or close of a recording medium loading unit; and actuating a main application of the reproduction device of the recording medium.

In other aspect of the present invention, a reproduction device of a recording medium comprises a recording medium loading unit loading the recording medium, and inputting and/or outputting data of the recording medium; a main board provided with a central processing unit implementing reproduction of the recording medium in accordance with an input signal or a previously set program; and a key operation unit connected with a specific GPIO port of the main board.

Advantageous Effects

According to the present invention, the reproduction device of the recording medium and the method for operating the same have the following advantages.

First of all, after the power supply of the reproduction device of the recording medium is turned on, a sub application processing open and/or close of a loading unit of the recording medium is actuated to reduce the time required to detach or insert the recording medium from or to the reproduction device.

Second, since a loader of a loading unit of the reproduction device is directly connected with a key operation unit, the time required to detach or insert the recording medium from or to the reproduction device can be reduced.

DESCRIPTION OF REFERENCE NUMERALS OF MAIN PARTS IN THE DRAWINGS

10: optical recording medium loading unit
20: main board
30: key operation unit
32: open key
34: eject key

BEST MODE FOR CARRYING OUT THE INVENTION

Hereinafter, the preferred embodiments of the present invention will be described with reference to the accompanying drawings so that a person with ordinary skill in the art to which the present invention pertains carries out the present invention. Wherever possible, the same reference numbers will be used throughout the drawings to refer to the same or like parts. The detailed description of the same or like parts as or to those of the related art will be omitted.

Figure 1:
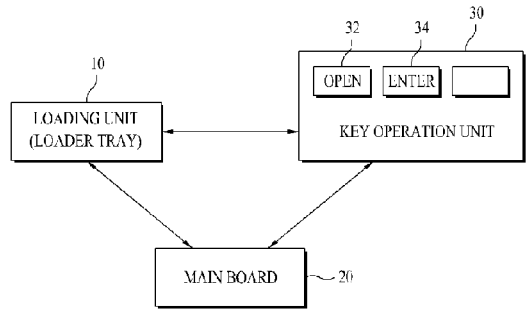
FIG. 1 is a brief diagram illustrating a configuration of a reproduction device of a recording medium according to one embodiment of the present invention.

FIG. 1 is a brief diagram illustrating a configuration of a reproduction device of a recording medium according to one embodiment of the present invention. Hereinafter, the reproduction device of the recording medium according to one embodiment of the present invention will be described with reference to FIG. 1.

As illustrated in FIG. 1, the reproduction device of the recording medium according to one embodiment of the present invention includes a recording medium loading unit 10, a main board 20, and a key operation unit 30.

The recording medium loading unit 10 loads an optical recording medium such as a blu-ray disc (BD), outputs video data and/or audio data stored in the recording medium, or inputs video data and/or audio data to the recording medium. In this case, example of the audio data and the video data include various contents such as music, movies and moving pictures. The loading unit 10 includes a tray (not shown). It is general that the tray is detached from the outside of the loading unit 10 to load the recording medium and then is inserted to the inside of the loading unit 10. The loading unit 10 includes a pick-up unit for input and output of video data and/or audio data in addition to the loading function for the recording medium.

The main board 20 includes a central processing unit (CPU). The central processing unit can control the operation of the reproduction device of the recording medium in accordance with a signal input by a user or a previously set program.

The key operation unit 30 can control the operation of the recording medium loading unit 10 or the pick-up unit. An open key 32 and an eject key 34 of the key operation unit 30 are shown in FIG. 1, and at least one of the open key 32 and the eject key 34 is directly connected with a loader (not shown) of the recording medium loading unit 10. In this case, direct connection between at least one of the open key 32 and the eject key 34 and the loader does not mean physical connection but mean that a signal of the open key 32 or the eject key 34 can be transferred to the loader without implementation of other application.

When the video data and/or audio data are output from or input to the optical recording medium stored in the optical recording medium loading unit 10, it is preferably required that the tray is not opened. Accordingly, the central processing unit can command to reject the open key and the eject key of the key operation unit when the data of the recording medium are being input and/or output. At this time, a motor drive is turned off so that input of the video data and/or audio data of the optical recording medium is performed stably.

In the aforementioned reproduction device of the optical recording medium according to the present invention, the open key or the eject key on the front surface of the key operation unit is directly connected with the loader to open the tray immediately after the loader is booted.

MODE FOR THE INVENTION

Figure 2:
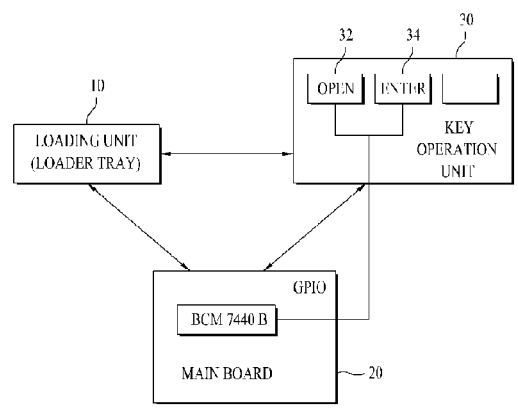
FIG. 2 is a brief diagram illustrating a configuration of a reproduction device of a recording medium according to another embodiment of the present invention.

FIG. 2 is a brief diagram illustrating a configuration of a reproduction device of a recording medium according to another embodiment of the present invention. Hereinafter, the reproduction device of the recording medium according to another embodiment of the present invention will be described with reference to FIG. 2.

As illustrated in FIG. 2, the reproduction device of the recording medium according to another embodiment of the present invention includes a recording medium loading unit 10, a main board 20, and a key operation unit 30.

The recording medium loading unit 10 loads an optical recording medium such as a blu-ray disc (BD), outputs video data and/or audio data stored in the optical recording medium, or inputs video data and/or audio data to the optical recording medium. In this case, example of the audio data and the video data include various contents such as music, movies and moving pictures.

The main board 20 includes a central processing unit (CPU). The central processing unit can control the operation of the reproduction device of the recording medium in accordance with a signal input by a user or a previously set program.

If a tray open signal of the loading unit is input to the central processing unit of the main board 20 in accordance with the signal input by the user or the previously set program, the central processing unit applies a driving signal to a motor drive (not shown) through a general purpose input output (GPIO) port, so as to open the tray. Of course, if a close signal of the tray is input to the central processing unit, the central processing unit of the main board 20 applies the driving signal to the motor drive through the GPIO port so as to close the tray.

The key operation unit 30 can control the operation of the recording medium loading unit 10 or the pick-up unit. At this time, the key operation unit 30 is connected with a specific GPIO port of the main board. In this case, connection between the key operation unit and the specific GPIO port of the main board means that a signal of the open key or the eject key of the key operation unit can be transferred to the specific GPIO port of the main board without implementation of other application.

In FIG. 2, the key operation unit 30 is connected with a GPIO port of 7440B of the main board. At this time, a tray eject routine for ejecting a tray 12 of the recording medium loading unit 10 is stored in a bios ROM. A bios stored in the bios ROM determines to select an eject selection unit based on a low/high state of a GPIO port to which an eject selection signal is input, and implements the tray eject routine in accordance with the determined result. Namely, the input of the key operation unit 30 is directly sensed by a specific GPIO of the main board 20 and then processed.

In the reproduction device of the optical recording medium according to the aforementioned embodiment, the open key or the eject key on the front surface of the key operation unit is connected with the GPIO of 7440B so that GPIO monitoring is performed after ATAPI Block Loading of Kernel, thereby opening and closing the tray through Atapi command.

Figure 3:
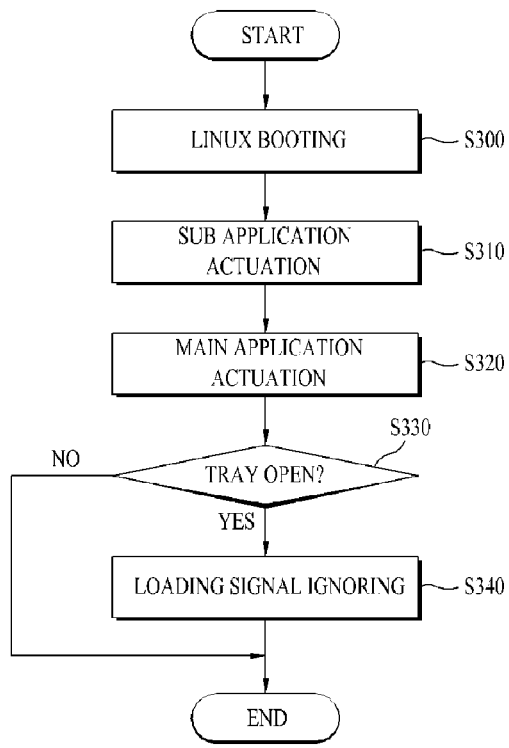
FIG. 3 is a flow chart illustrating a method for operating a reproduction device of a recording medium according to the present invention.

FIG. 3 is a flow chart illustrating a method for operating a reproduction device of a recording medium according to the present invention. Hereinafter, the method for operating the reproduction device of the recording medium according to the present invention will be described with reference to FIG. 3.

First of all, an operation program of the reproduction device of the recording medium, for example, Linux is booted (S300).

Subsequently, a sub application processing open and/or close of the loading unit of the recording medium is actuated (S310). At this time, the sub application is actuated so that a specific GPIO port of the main board provided with a central processing unit can recognize the input of the key operation unit, wherein the central processing unit implements a control program in accordance with a signal input by a user. Also, the specific GPIO port is connected with at least one of the open key and the eject key of the key operation unit.

Specifically, while the sub application is being actuated, the main board senses an input means of the user, for example, the input of the key operation unit. As a result, if a tray open signal is input, a motor drive opens the tray in accordance with a signal transferred thereto by using the output of the specific GPIO port of the main board as a low signal.

A main application of the reproduction device of the recording medium is actuated (S320).

While the main application is being actuated, video data and/or audio data are input or output from the optical recording medium stored in the optical recording medium loading unit. Accordingly, for stable input or output, a command to reject the tray open or eject signal is performed when the tray open or eject signal is input from the key operation unit (S320). At this time, the aforementioned motor drive is turned off, whereby the input of the video data and/or audio data of the optical recording medium can be performed stably.

Even though the main application is actuated, when the tray is opened, the video data and/or the audio data cannot be input or output from the optical recording medium. Accordingly, in order to input or output the video data and/or the audio data from the optical recording medium within the tray, the tray is first closed. To this end, after sensing close/open of the tray (S33), the main board outputs the output of the GPIO port as a high signal, i.e., a tray loading signal if the tray is closed, and then transfers the output signal to the motor drive 106.

If the tray is opened, the main board outputs the output of the GPIO port as a low signal and then transfers a motor drive mute signal to the motor drive. Accordingly, even though the loading signal of the optical recording medium is input from the key operation unit, the optical recording medium is not loaded in the tray. Namely, if the tray is opened, the main board performs a command to ignore the loading signal of the recording medium (S340).

In the embodiment of the aforementioned method for operating the reproduction device of the recording medium according to the present invention, before the main application is actuated after Linux booting, a specific application that can process open or close of the tray is first actuated. The actuated specific application can recognize the input of the open key and the close key of the key operation unit until an IO routine of the main application is initiated.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

In the reproduction device of the recording medium and the method for operating the same according to the present invention, it is possible to reduce the time required to detach or insert the recording medium from or to the tray after the power supply is turned on.

SEQUENCE LISTING

BD, tray, sub application

The invention claimed is:

1. A reproduction device of a recording medium, the reproduction device comprising:
a recording medium loading unit configured to load the recording medium, and input and/or output data of the recording medium;
a main board configured to include a central processing unit, the central processing unit configured to implement reproduction of the recording medium in accordance with an input signal or a previously set program; and
a key operation unit directly connected with a loader of the recording medium loading unit,
wherein at least one of an open key and an eject key of the key operation unit transfers a signal of the open key or eject key to the loader without implementation of other application.

2. The reproduction device as claimed in claim 1, wherein at least one of an open key and an eject key of the key operation unit is directly connected with the loader.

3. The reproduction device as claimed in claim 2, wherein the central processing unit is further configured to perform a command to reject the input of the open key and the eject key of the key operation unit while the data of the recording medium are being input or output.

4. A method for operating a reproduction device of a recording medium, the method comprising:
booting an operation program of the reproduction device of the recording medium;
actuating a sub application processing open and/or close of a recording medium loading unit, wherein a specific general purpose input output (GPIO) port of a main board within the reproduction device recognizes an input of key operation unit connected with the specific GPIO port, the main board including a central processing unit for implementing a control program in accordance with a user signal; and actuating a main application of the reproduction device of the recording medium.

5. The method as claimed in claim 4, wherein the specific GPIO port recognizes at least one of the inputs of an open key and an eject key of the key operation unit.

6. The method as claimed in claim 4, further comprising performing a command to reject the input of the key operation unit while the main application is being actuated.

7. The method as claimed in claim 4, further comprising performing a command to ignore a loading signal of the recording medium if a tray is opened.

8. A reproduction device of a recording medium, the reproduction device comprising:

a recording medium loading unit configured to load the recording medium, and input and/or output data of the recording medium;

a main board provided with configured to include a central processing unit, the central processing unit configured to implement reproduction of the recording medium in accordance with an input signal or a previously set program; and a key operation unit connected with a specific GPIO port of the main board, wherein the specific GPIO port is configured to recognize an input of the key operation unit.

9. The reproduction device as claimed in claim 8, wherein at least one of an open key and an eject key of the key operation unit is connected with the specific GPIO port.

10. The reproduction device as claimed in claim 8, wherein at least one of a open key and a eject key of the key operation unit transfers a signal of the open key or the eject key to the specific GPIO without implementation of other application.

* * * * *